United States Patent [19]

Johnson, Jr. et al.

[11] Patent Number: 4,629,147
[45] Date of Patent: Dec. 16, 1986

[54] OVER-THE-WING PROPELLER

[75] Inventors: Joseph L. Johnson, Jr., Newport News; E. Richard White, Seaford, both of Va.

[73] Assignee: The United States of America as represented by the Administrator of the National Aeronautics and Space Administration, Washington, D.C.

[21] Appl. No.: 846,462

[22] Filed: Mar. 26, 1986

Related U.S. Application Data

[63] Continuation of Ser. No. 661,478, Oct. 16, 1984, abandoned.

[51] Int. Cl.⁴ .............................................. B64D 27/02
[52] U.S. Cl. ....................................... 244/55; 244/130
[58] Field of Search ...................... 244/54, 55, 65, 13, 244/130

[56] References Cited

U.S. PATENT DOCUMENTS 1,990,606 2/1935 Sunkers ................................. 244/54
3,188,025 6/1965 Moorehead ........................... 244/55

FOREIGN PATENT DOCUMENTS 1241273 5/1967 Fed. Rep. of Germany ........ 244/55
1295389 5/1969 Fed. Rep. of Germany ........ 244/55
 695254 12/1930 France ................................... 244/55

OTHER PUBLICATIONS

*Popular Science*, "Future Commuter", Feb. 1983.

Primary Examiner—Galen Barefoot
Attorney, Agent, or Firm—Wallace J. Nelson; Howard J. Osborn; John R. Manning

[57] ABSTRACT

This invention is an aircraft 10 with a system for increasing the lift-drag ratio over a broad range of operating conditions. The system positions the engines and nacelles 15 over the wing 12 in such a position that gains in propeller 16 efficiency is achieved simultaneously with increases in wing lift and a reduction in wing drag. Adverse structural and torsional effects on the wings 12 are avoided by fuselage mounted pylons which attach to the upper portion of the fuselage 11 aft of the wings. Similarly, pylon-wing interference is eliminated by moving the pylons to the fuselage. Further gains are achieved by locating the pylon surface area aft of the aircraft center-of-gravity, thereby augmenting both directional and longitudinal stability. This augmentation has the further effect of reducing the size, weight and drag of empennage components 13. The combination of design changes results in improved cruise performance and increased climb performance while reducing fuel consumption and drag and weight penalties.

7 Claims, 8 Drawing Figures

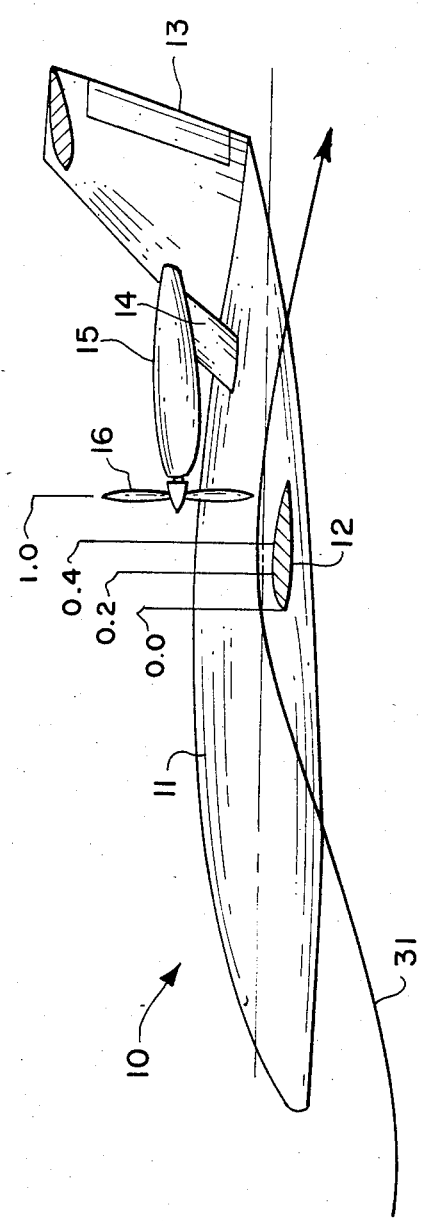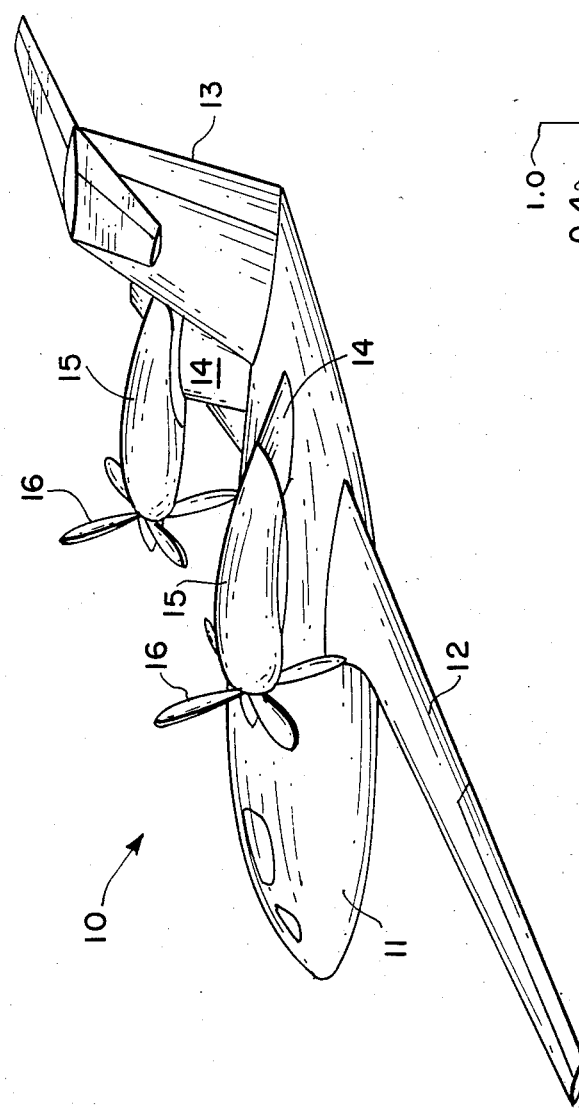

OVER-THE-WING PROPELLER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

This application is a continuation of Ser. No. 661,478, filed 10/16/84, now abandoned.

BACKGROUND OF THE INVENTION

This invention relates to propeller driven aircraft, and more particularly to propeller location relative to the aircraft wing.

Many conventionally configured propeller aircraft have engines mounted in front of the wing. This arrangement meets structural requirements by uncoupling inertial and aerodynamic moments about the wing axis and by allowing nacelle attachment to the main wing spar. However, aerodynamic penalties result from flow interference between the wing and nacelle and from blockage of the propeller slipstream by the wing. Earlier designs have attempted to minimize these penalties by positioning the propulsion means above the wing. An early example is the Custer channelwing. In this aircraft, the wing extends outward from the fuselage to the propeller arc and then curves downward around the propeller, forming a half-circle, and then extends horizontally to the tip. More recent examples are embodied in tactical assault transports such as the YC-14 and 17 where jet engines are mounted over the wing. Each of these designs have been able to create additional lift at low speeds using induced flow over the upper surface of the wing. The additional lift is a result of increased circulation around the wing produced primarily by propulsion wash and entrained air flow over the rearward portions of the airfoil. These designs have limited application because the drag penalty is greater than conventional designs. The turbulent wake flowing over the wing reduces the laminar flow region. In addition, nacelle-wing interference may be greater with the over wing engine where nacelles and pylons extending from the wing are in an accelerated and more critical flow field. Additionally, the over wing mount tends to block a portion of the wing. The purpose of the present invention is to broaden the operating envelope of prior designs while minimizing the disadvantages thereof.

Accordingly, it is an object of the present invention to provide a propeller location which induces airflow over the wing in such a manner as to increase lift while reducing drag.

A further object of the present invention is to reduce nacelle-wing interference in order to minimize nacelle drag.

Another object of the present invention is to eliminate pylon wing interference in order to minimize pylon drag.

Still another object of the present invention is to reduce wing structural loads and particularly torsional loads inherent in many over-the-wing designs.

SUMMARY OF THE INVENTION

These and other objects of the invention are achieved by mounting the engine pylons on the fuselage aft of the wing trailing edge. These pylons extend outward and upward so as to allow positioning of the engine and nacelle at the proper location over the wing. Propeller location for the preferred embodiment of the present invention is at the 20 percent chord point. This configuration results in a 25 percent reduction in wing drag and a 20 percent increase in rate of climb for the test vehicle. Depending upon particular airfoil characteristics other designs may require propeller locations between 0 and 40 percent chord.

BRIEF DESCRIPTION OF THE DRAWINGS

For a more complete understanding of the present invention and for further objects and advantages thereof, reference is now made to the following description taken in conjunction with the accompanying drawings wherein:

FIG. 1 is a perspctive view of an aircraft of the present invention showing engine/wing arrangement and the fuselage mounted pylons;

FIG. 3 is a side view of the aircraft shown in FIG. 2 and illustrating specific propeller locations tested;

DETAILED DESCRIPTION OF THE INVENTION

Figure 2:
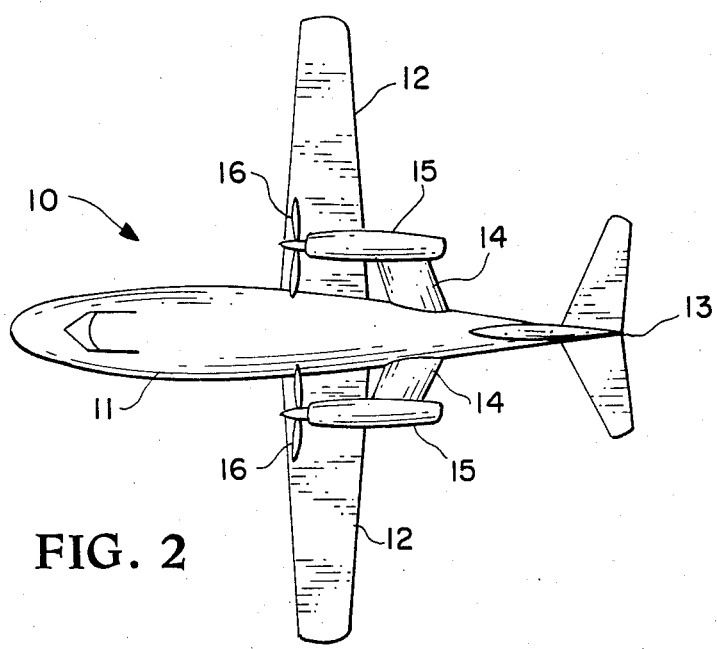
FIG. 2 is a top view of the aircraft shown in FIG. 1.

Referring to FIG. 1, the aircraft showing the preferred embodiment of the configuration is designated generally by the numeral 10. It is comprised of a fuselage 11 with a low-mounted wing 12 and an empennage section 13. The engines with nacelles 15 are attached to the aft fuselage section by pylons 14. Propellers 16 are positioned to place the plane of rotation over the wing 12.

The location of propeller plane of rotation is further depicted in FIG. 2 where the propellers 16 are behind the leading edge of wing 12. The greatest performance gains are achieved when the propeller are located at the 20% chord.

FIG. 3 depicting the preferred embodiment is a side view shows tested propeller 16 locations as a fraction of the wing 12 chordline, 0.0 being the leading edge location, 0.2 and 0.4 being the 20% and 40% chord point, and 1.0 being the trailing edge location. In each of the embodiments, the propeller tip clearance above the wing surface is in the range of 0.03 to 0.15 chord lengths.

Figure 4:
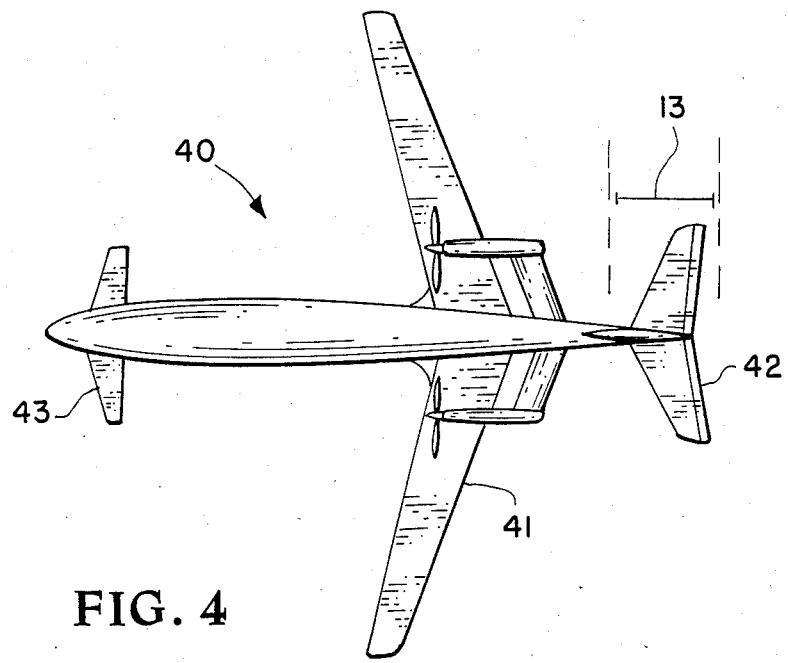
FIG. 4 is a top view of an alternate embodiment using forward swept wings.

Several alternative embodiments are within the scope of the present invention. These alternatives yield similar performance improvements using the over-the-wing propeller configuration. The principal effect of the alternative embodiments is to change stability coefficients as may be required for a particular design. FIG. 4 depicts one such alternative embodiment. As directional stability is reduced in the configuration of aircraft 40, a low-mounted horizontal stabilizer 42, which improves directional stability, is preferred. A canard stablizer designated by reference numeral 43, is also employed for aircraft 40.

The present invention improves performance over prior art by a combination of design changes. Nacelle wing interference is reduced in the present invention by positioning the engines well clear of the wings and pylon wing interference is reduced by mounting the pylons on the aft fuselage section. Further, the pylons are aerodynamic surfaces which contribute lift and, being located behind the center-of-gravity, the pylons contribute to both directional and longitudinal stability. These contributions reduce the required size, and therefore weight and drag, of the empennage section 13.

Of further note is the flow mechanism employed by aircraft of the present invention. The aircraft of the present invention incurs a drag penalty, as in prior art, caused by the reduction in laminar flow where the turbulent propeller wash impinges on the wing surface. However, unlike the prior art, the precise positioning of the propeller in the present invention optimizes induced flow over the forward portion of the wing such that the induction effects alter the freestream flow well ahead of the wing leading edge. A stream line 31 shown in FIG. 3 shows the upstream influence of the propeller induced flow. Well before reaching the wing, the flow is already being drawn up and over the wing. In this manner, a reduction in profile blockage of the wing is achieved.

Figure 5:
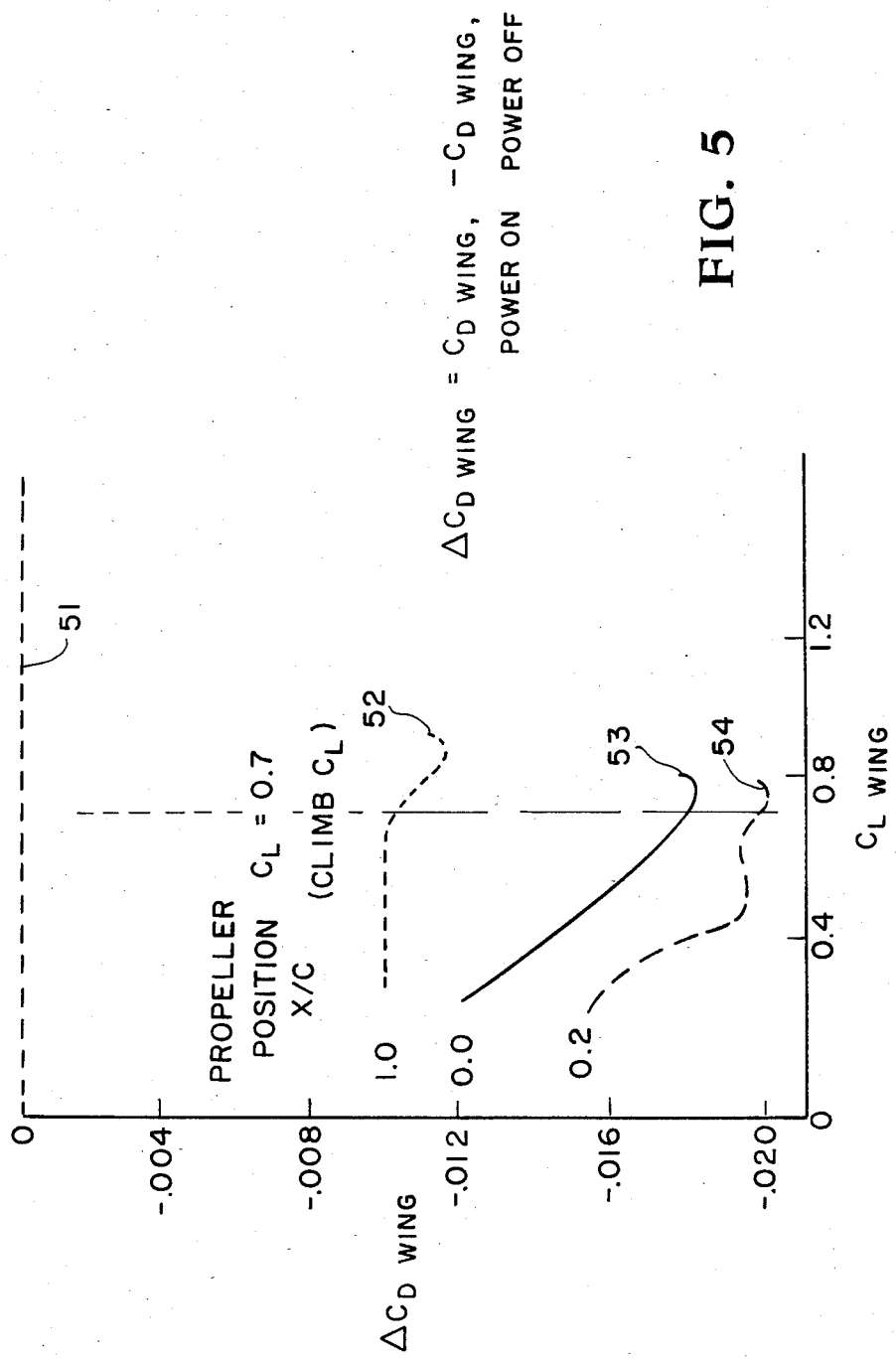
FIG. 5 is a plot of data which shows drag reduction on the wing illustrated in FIGS. 1-3.

The value of the wing coefficient of drag, $C_{D(wing)}$, for a design similar to the preferred embodiment is typically in the range of 0.07 to 0.08. FIG. 5 depicts the changes in $C_{D(wing)}$, for various propeller locations. The plot labeled 51 is the baseline wing without induced flow. Plot 52 is the reduction in $C_{D(wing)}$ for a propeller location at the trailing edge of the wing, plot 53 for a leading edge location, and plot 54 for the preferred location at the 20% chord. As can be seen, the preferred embodiment results in a substantial reduction of wing drag in the range of 20%.

Figure 6:
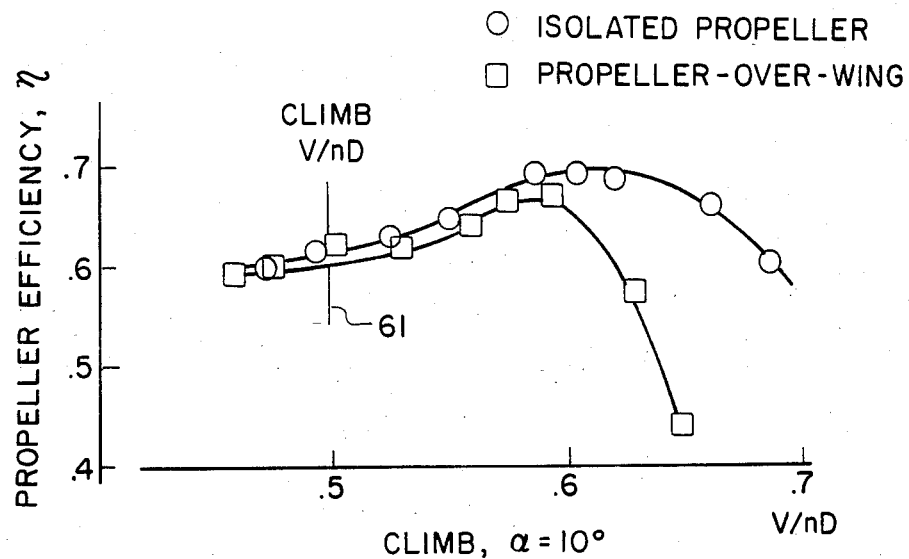
FIG. 6 graphically illustrates propeller efficiency effects of the present invention during climb.
Figure 7:
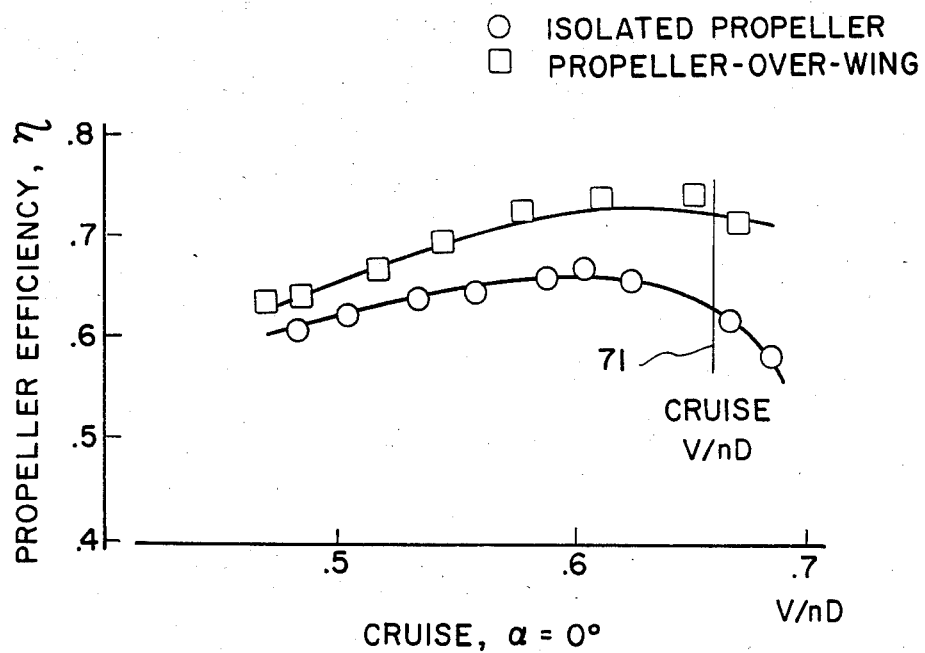
FIG. 7 graphically illustrates propeller efficiency of the present invention during cruise.
Figure 8:
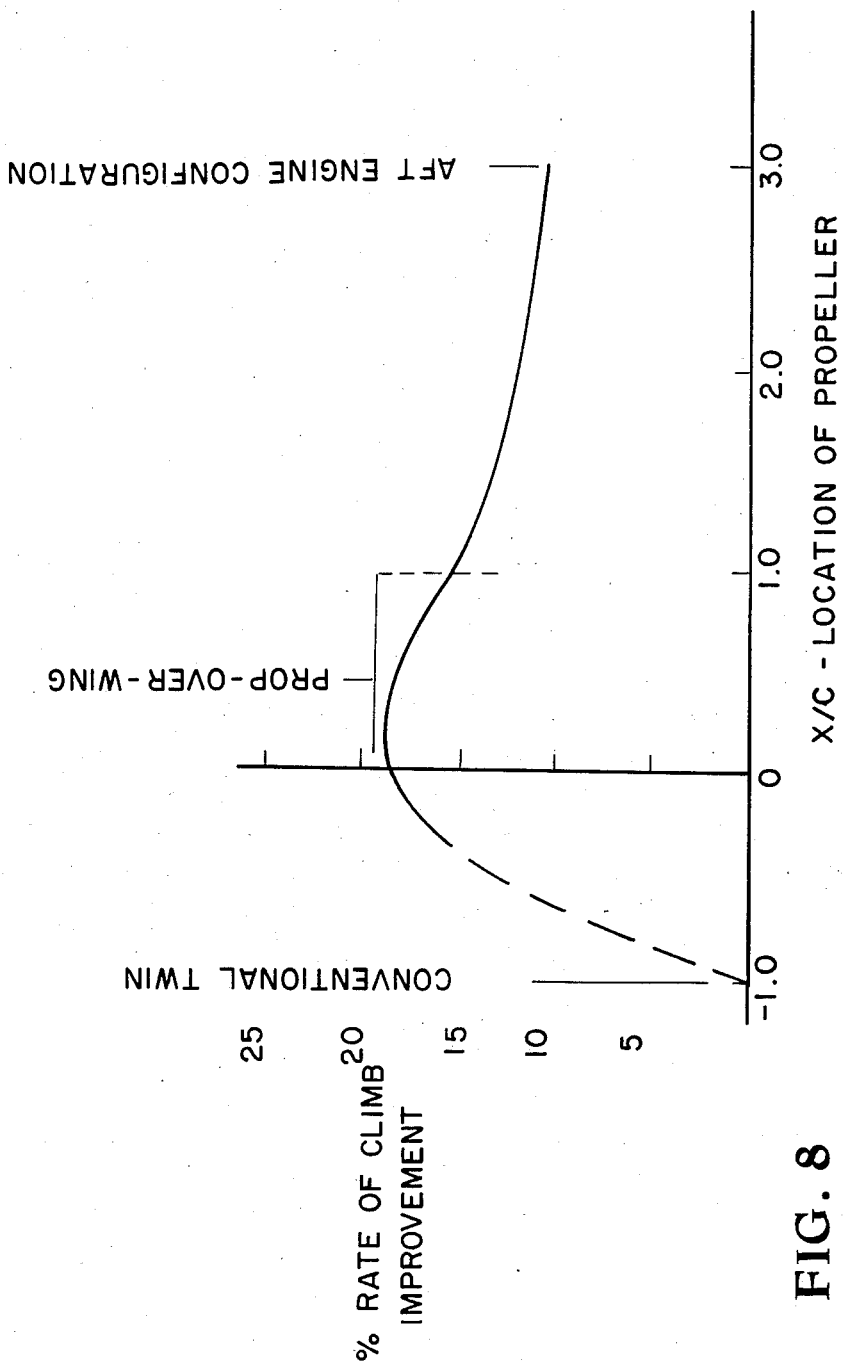
FIG. 8 is a plot of data which shows rate of climb improvements of the present invention.

A synergistic effect is also achieved in the present invention by using wing flow patterns to produce a net gain in propeller efficiency. The positioning of the propeller allows the wing surface to act as an inlet aligning the flow through the propeller. Further, tip losses are reduced by the fence effect of the wing in the lower half of the propeller arc. Referring to FIG. 6, experimental results show a negligible loss of 1-2% in propeller efficiency at climb speed 61. At cruise however, a gain in propeller efficiency is achieved as shown at cruise speed 71 in FIG. 7. The overall results of the present invention can be best seen in FIG. 8 showing the effect of propeller location on climb performance. The origin of the plot represents the conventionally configured twin-engine aircraft with a propeller location at one chord length ahead of the wing. Point 81 is the propeller location above the leading edge of the wing, point 82 the preferred location above the 20% chord, and point 83 is the trailing edge of the wing. At the preferred location, climb performance is increased by 20%. Through the combination of design factors, the present invention improves cruise performance, increase climb performance and increases fuel economy while reducing weight and structural penalties in the wings, empennage and engine pylons. Further data concerning the performance improvements of the invention is available in the American Institute of Aeronautics and Astronautics, *Technical Report AIAA*-83-2531, entitled "Exploratory Low-Speed Wind-Tunnel Investigation of Advanced Computer Configurations Including an Over-the-Wing Propeller Design" presented at the AIAA Aircraft Design, Systems and Technology Meeting held at Fort Worth, Tex., Oct. 17-19, 1983, which is incorporated herein by reference.

What is claimed as new and desired to be secured by Letters Patent of the United States is:

1. A system to improve aircraft lift-to-drag comprising:
    an aircraft;
    said aircraft having propellers mounted over the wing with the propeller tips passing in close proximity to the wing upper surface;
    said propellers located in a fore and aft direction with respect to the wing in a region where the aerodynamic flow is accelerating or at maximum velocity and causing a change in flow field such that wing drag is decreased, wing lift is increased, and propeller thrust is increased, all simultaneously and over a broad range of flight conditions;
    said propellers having engines, nacelles and pylons mounted outside the accelerated flow of the wing so as to reduce skin friction drag and form drag, and so as to avoid interference drag between wing and pylons and flow blockage over the wing.

2. A system to improve aircraft lift-to-drag as in claim 1 wherein the propeller fore and aft position lies between the leading edge of the wing and the 20% chord.

3. A system to improve aircraft lift-to-drag as in claim 1 wherein the propellers are mounted through engine nacelles with pylons attached to the aircraft fuselage.

4. A method of improving the lift-to-drag ratio of an aircraft having a fuselage, wing and propeller-driven propulsion system comprising the steps of:
    (a) providing engine pylons mounted to the fuselage above and aft of the wings;
    (b) positioning the engines and nacelles over the wings outside of the accelerated flow;
    (c) positioning the propellers such that the propeller arc is above the wing in the accelerating or maximum velocity airflow, typically near the 20 percent chord point of the wing;
    (d) positioning the propellers such that propeller tip vortex is attenuated which typically requires a clearance above the wing in the range of 0.3 to 0.15 chord length of the wing upper surface.

5. In combination with a propeller driven aircraft, a system for improving the aircraft lift-to-drag efficiency comprising in combination:
    an aircraft having a fuselage, an empennage assembly, a wing and a pair of engine driven propellers;
    said propellers being mounted on separate engine nacelles; and
    a pair of engine pylons secured to said aircraft fuselage aft of said wing so as to position said propellers in the accelerating or maximum velocity flow over said wing and thereby induce air flow over said wing to increase the wing lift while simultaneously reducing wing drag and increasing propeller thrust.

6. The combination of claim 5 including said propeller being located in the region of accelerating or maximum velocity air flow between the wing leading edge and the 20% chord thereof.

7. The combination of claim 5 including said wing having a forward sweep, said empennage assembly including a low-mounted horizontal stabilizer and said fuselage being provided with a canard stabilizer.

* * * * *